United States Patent
Lu et al.

(10) Patent No.: US 10,558,648 B2
(45) Date of Patent: *Feb. 11, 2020

(54) SERVICE OUTAGE TIME REDUCTION FOR A PLANNED EVENT IN A SYSTEM

(71) Applicant: INTERNATIONAL BUSINESS MACHINES CORPORATION, Armonk, NY (US)

(72) Inventors: E Feng Lu, Beijing (CN); Yu Fang, Beijing (CN); Ying Mao, Beijing (CN); Ning LL Liu, Beijing (CN); Lu Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/602,215

(22) Filed: May 23, 2017

(65) Prior Publication Data
US 2018/0341560 A1    Nov. 29, 2018

(51) Int. Cl.
 *G06F 16/23*    (2019.01)
 *G06F 11/20*    (2006.01)
 *G06F 16/27*    (2019.01)

(52) U.S. Cl.
 CPC ...... *G06F 16/2379* (2019.01); *G06F 11/2023* (2013.01); *G06F 16/27* (2019.01); *G06F 2201/80* (2013.01)

(58) Field of Classification Search
 CPC .................................................. G06F 11/1662
 USPC ....................................................... 714/4.11
 See application file for complete search history.

(56) References Cited

U.S. PATENT DOCUMENTS

| | | | | |
|---|---|---|---|---|
| 5,799,323 | A  * | 8/1998  | Mosher, Jr. ......... | G06F 11/1458 |
| 7,383,191 | B1   | 6/2008  | Herring et al. | |
| 7,389,379 | B1 * | 6/2008  | Goel .................. | G06F 11/1662 711/112 |
| 9,032,160 | B1   | 5/2015  | Natanzon et al. | |
| 9,195,702 | B2   | 11/2015 | Bourbonnais et al. | |
| 9,280,591 | B1 * | 3/2016  | Kharatishvili .... | G06F 17/30575 |

(Continued)

OTHER PUBLICATIONS

IBM, "Reducing Downtime for Planned Outages . . . with IBM Multi-site Workload Lifeline", © 2014 IBM Corporation, pp. 1-9.

(Continued)

*Primary Examiner* — Jason B Bryan
*Assistant Examiner* — Indranil Chowdhury
(74) *Attorney, Agent, or Firm* — Michael O'Keefe

(57) ABSTRACT

A method, computer program product, and a computer system, to store information related to changed data in response to a transaction with a first database of the on-line system requested during a planned period and data in the first database changed by the transaction. In response to a planned event a back-up system with a second database is switched to set up a new connection and a new transaction with the second database, wherein the second database is backup of the first database. The on-line system prevents setting up a new connection to the on-line system and prevents conducting a new transaction with the first database, sends information related to the changed data from the on-line system to the back-up system, and switches to the back-up system for a new connection and for a new transaction. The on-line system synchronizes data between the first database and the second database.

6 Claims, 10 Drawing Sheets

(56) References Cited

U.S. PATENT DOCUMENTS

| | | | |
|---|---|---|---|
| 9,639,436 B2* | 5/2017 | Arnold | G06F 11/1662 |
| 2007/0260696 A1* | 11/2007 | Bohannon | G06F 11/1662 |
| | | | 709/208 |
| 2013/0318221 A1 | 11/2013 | Anaya et al. | |
| 2014/0282596 A1 | 9/2014 | Bourbonnais et al. | |
| 2018/0246928 A1* | 8/2018 | Kim | G06F 16/2365 |

OTHER PUBLICATIONS

Bourbonnais et al., "The Value of Active-Active Sites with Q Replication for IBM DB2 for z/OS An Innovative IBM Client's Experience", IBM International Technical Support Organization, ibm.com/redbooks, Redpaper, © Copyright International Business Machines Corporation 2015, Jan. 21, 2015, pp. 1-104.

Mell et al., "The NIST Definition of Cloud Computing," National Institute of Standards and Technology, Sep. 2011, p. 1-3, Special Publication 800-145.

Lu et al., "Service Outage Time Reduction for a Planned Event in a System", U.S. Appl. No. 15/825,731, filed Nov. 29, 2017.

List of IBM Patents or Patent Applications Treated as Related. Filed Nov. 29, 2017. 2 pages.

* cited by examiner

SERVICE OUTAGE TIME REDUCTION FOR A PLANNED EVENT IN A SYSTEM

BACKGROUND

The present disclosure relates to the field of software updating, and more specifically, to a method, system and computer program product for reducing service outage time for a planned event in a system.

Continuous availability of Information Technology (hereinafter "IT") is important for companies which provide IT services, such as finical IT service or banking IT service. An hour of service outage may lead to significant financial loss for a company which provides IT services and also may result in a negative reputation of the company.

SUMMARY

Example embodiments of the present disclosure disclose a method, a system, and a computer program product for reducing service outage time for a planned event in an on-line system.

In an embodiment, a computer-implemented method is disclosed. According to the method, an on-line system stores information related to changed data in response to existing transactions with a first database of the on-line system being conducted during a planned period and data in the first database being changed by the transactions. In response to a planned event occurring in which a back-up system with a second database is switched to set up new connections and new transactions with the second database are conducted, wherein the second database is backup of the first database, the on-line system executes several actions. First, the on-line system stops both setting up new connections in the on-line system and conducting existing transactions with the first database. Second, the on-line system sends the information related to the changed data to the back-up system. Third, the on-line system switches to the back-up system to set up new connections and to conduct new transactions with the second database. At last, the on-line system synchronizes data between the first database and the second database.

In another embodiment, a computer system is disclosed. The system may include an on-line system with a first database, a back-up system with a second database and a memory coupled to the on-line system and the back-up system and storing instructions thereon. The instructions is capable of performing the above computer-implemented method.

In another embodiment, a computer program product is disclosed. The computer program product is tangibly stored on a non-transient machine-readable medium and may comprise machine-executable instructions. When executed on a device, the instructions may cause the device to perform the above computer-implemented method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The following detailed description, given by way of example and not intended to limit the invention solely thereto, will best be appreciated in conjunction with the accompanying drawings, in which.

Through the more detailed description of some embodiments of the present disclosure in the accompanying drawings, the above and other objects, features and advantages of the present disclosure will become more apparent. Throughout the drawings, the same or similar reference numerals represent the same or similar elements.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to the field of software updating. One way to reduce service outage time for a planned event in a system is to keep track of changed data and determine if a new service request is related to the changed data. An embodiment by which to is to keep track of changed data and determine if a new service request is related to the changed data is described in detail below by referring to the accompanying drawings in FIGS. 1 to 10. Those skilled in the art will readily appreciate that the detailed description given herein with respect to these figures is for explanatory purposes as the invention extends beyond these limited embodiments.

Figure 1:
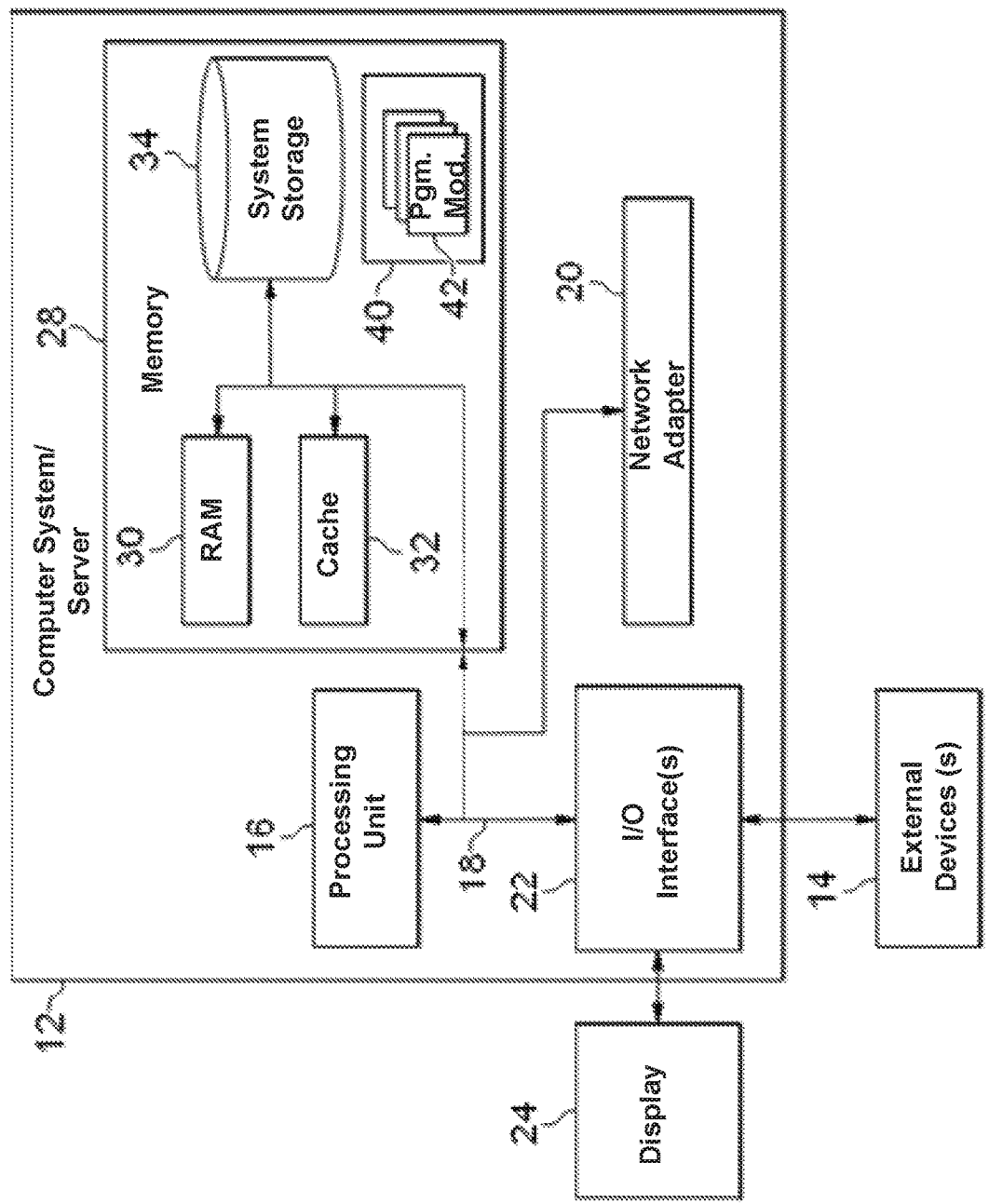
FIG. 1 is an exemplary computer system which is applicable to implement an embodiment of the present invention.

Referring now to FIG. 1, an exemplary computer system/server 12 in accordance with an embodiment of the present invention is shown. FIG. 1 is also adapted to depict an illustrative example of a portable electronic device such as a communication device which is applicable to implement embodiments of the present invention. It should be appreciated that FIG. 1 provides only an illustration of an implementation and does not imply any limitations with regard to the environments in which different embodiments may be implemented. Many modifications to the depicted environment may be made.

As shown in FIG. 1, the computer system/server 12 is shown in a form of a general-purpose computing device. Components of the computer system/server 12 may include, but are not limited to, one or more processors or processing units 16, a system memory 28, and a bus 18 that couples various system components including the system memory 28 to the one or more processors or processing units 16.

The bus 18 represents one or more of any of several types of bus structures, including a memory bus or memory controller, a peripheral bus, an accelerated graphics port, and a processor or local bus using any of a variety of bus architectures. The bus 18 may be implemented with any architecture designed for passing data and/or control information between processors (such as microprocessors, communications and network processors, etc.), system memory, peripheral devices, and any other hardware components within a system. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that the enable computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via network adapter 20. As depicted, network adapter 20 communicates with the other components of the computer system/server 12 via bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

In an IT system of a company, many events may lead to service outage, for example, application problems, software upgrading, etc. Events can be classified as either planned or unplanned. When a planned event occurs, such as a software upgrade according to a plan from an administrator, a planned system switch from an on-line system to a back-up system may be executed in which all steps in the switch can be controlled. When an unplanned event occurs, for example an on-line system cannot function normally, an unplanned system switch may occur. Ongoing development of software technology combined with a growth in demand of users, results in frequent upgrades of software in a service company. There is a need for reducing a service outage time brought by such planned events. This disclosure relates to service outage time reduction for planned events.

It should be noted, however, that processing may, in some instances be shared amongst a client computer system/server 12 and a server computer system/server 12 in any ratio.

Figure 2:
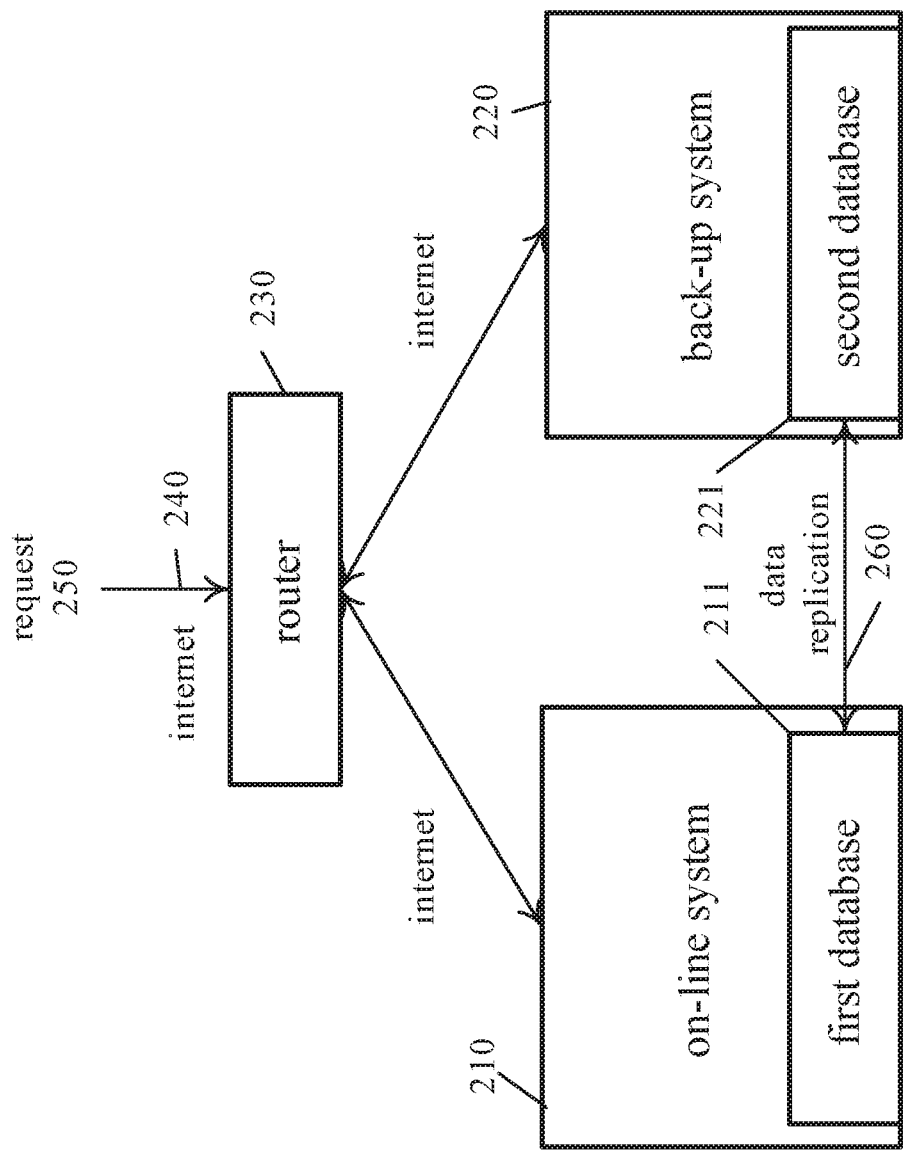
FIG. 2 is a block diagram of both an on-line system and a back-up system, in accordance with an embodiment of the present invention.

Referring now to FIG. 2, a block diagram of both an on-line system and a back-up system, in accordance with an embodiment of the present invention, is shown. An on-line system 210 which can support an on-line service request, may comprise an application server, and a first database 211, as well as other system components, are shown. A back-up system 220 may be a backup of the on-line system 210, and may also comprise an application server, and a second database 221 which can be a backup of the first database 211, as well as other system components. The application servers in the on-line system 210 and the back-up system 220 may run the same applications. During normal operation the on-line system 210 may receive a service request 250 from a customer and may conduct transactions with the first database 211, while the back-up system 220 may not receive the service request 250. The on-line system 210 and the back-up system 220 may each comprise one or more computer system/servers 12 as shown in FIG. 1, and may each comprise a cloud computing system.

The on-line system 210 may receive a service request 250 sent from a customer via router 230 though internet 240. The on-line system 210 may set up a connection with a customer to conduct transactions with the first database 211. During a planned event, the service request 250 from the customer may be switched from the on-line system 210 to the back-up system 220, and the back-up system 220 may respond to the service request 250. Data in the first database 211 in the on-line system 210, and data in the second database 221 in the back-up system 220 may be synchronized or replicated though a private network 260. Synchronization may be performed using a data replication operation in the first database 211 and in the second database 221, and a network switch may quick switch from the on-line system 210 to the back-up system 220 such that the back-up system 220 may provide continuous availability for the customer to avoid a long service outage time. In an embodiment, the private network 260 may be an optical network specially designed for data replication with a high transmission speed, and may use an alternate network rather than internet 240.

Figure 3:
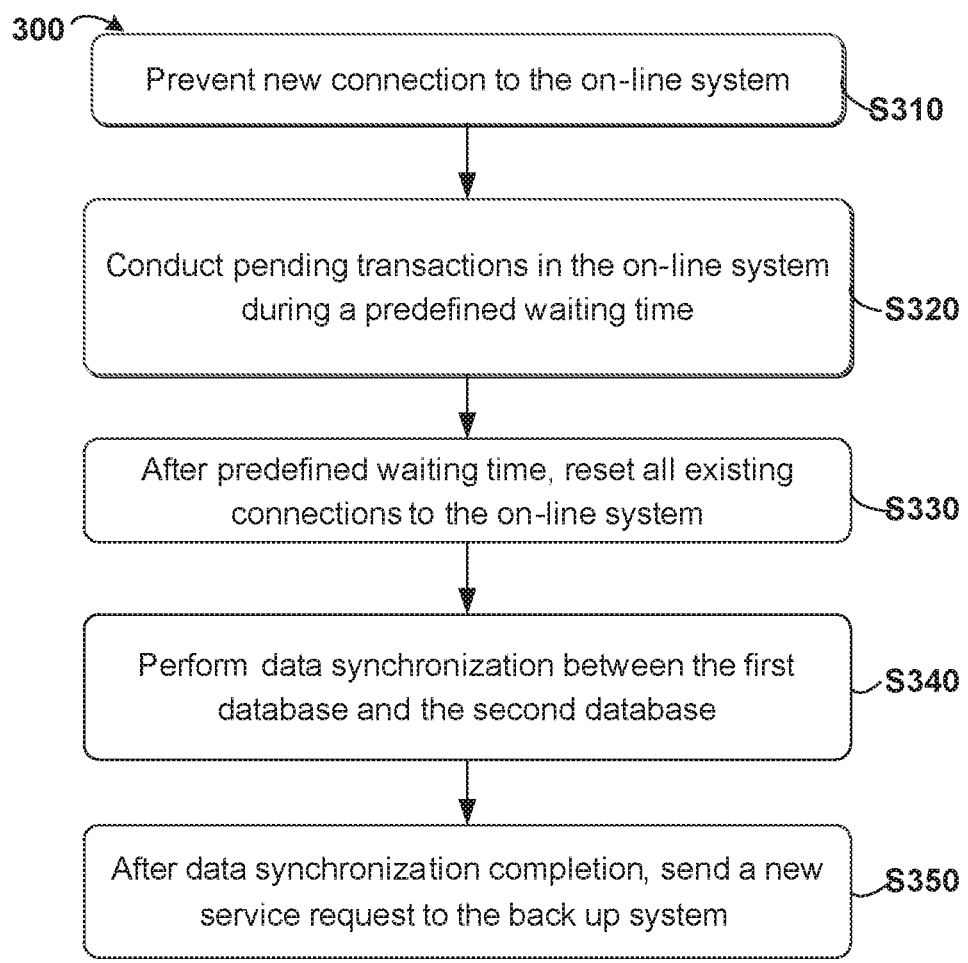
FIG. 3 is a flowchart for a planned event, in accordance with an embodiment of the present invention.

Referring now to FIG. 3, a flowchart for a planned event in an on-line system, in accordance with an embodiment of the present invention, is shown. This embodiment comprises a planned event, such as a software upgrade. The on-line system 210, as shown in FIG. 2, may not accept a new connection with a customer at step S310. The step S310 can be implemented by sending a "Quiesce" command to the on-line system 210. The "Quiesce" command may be sent by an administrator or by the on-line system 210. The "Quiesce" command can stop any new connections to the on-line system 210. There may be existing transactions with the first database 211 which may be pending in the on-line system 210, and also there may be a new service request 250, as shown in FIG. 2, for setting up a new connection from a customer.

Next, at step S320, pending transactions in the on-line system 210 may continue, and pending transactions with the first database 211 of the on-line system 210 can be conducted and the on-line system 210 may wait for a predefined waiting time during which a first set of pending transactions may be completed, while a second set of pending transactions may not be completed. After the predefined waiting time, the second set of pending transactions which have not been completed may fail but data related to the second set of pending transactions with the first database 211 may not be changed by the pending transactions because of database rollback mechanism. The database rollback mechanism is an operation which returns the database to a previous state. During the predefined waiting time for pending transactions, both the on-line system 210 and the back-up system 220 cannot provide service for new customers, e.g. there will be a service outage. The predefined waiting time may be set by a system administrator, and may be dynamically set.

Following the step S320, after an expiration of the predefined time, all existing connections in the on-line system 210 may be reset at step S330, resulting in no new or existing connections in the on-line system 210. The step S330 can be implemented by sending a "deactivate" command to the on-line system 210 either by the administrator or by the on-line system 210 itself. Using the "deactivate" command, all existing connections between a customer and the on-line system 210 may be reset in the on-line system 210.

At step S340, data synchronization between the first database 211 and the second database 221, as shown in FIG. 2, can be started by the on-line system 210 using a data replication operation with both databases, at step S340, and the on-line system 210 may wait until all pending data for replication in the first database 211 has been replicated to the second database 221. During the waiting time for the data synchronization, neither the on-line system 210 nor the back-up system 220 can provide service for a new customer, e.g. there is a service outage.

After competition of data synchronization between the first database 211 and the second database 221, at step S350, the router 230, as shown in FIG. 2, can be reset by the on-line system 210 to route a new service request 250 to the back-up system 220. The back-up system 220 can now receive the service request 250 from a customer. The step S350 can be implemented by sending new route information to the router 230 and also send an "activate" command to the back-up system 220. The "activate" command can be sent by the administrator or the on-line system 210 itself.

From the above existing process for the planned event, neither the on-line system 210 nor the back-up system 220 provide service for new customers during both the predefined waiting time for pending transactions and the waiting time for data synchronization. During an on-line system 210 heavy workload period, pending transactions and data synchronization may take an extended period of time to complete, contributing to a major part of a total service outage time, for a planned event in the system.

However, steps in the existing process for the planned events can be controlled, and necessary data can be obtained, thus it is possible to reduce a service outage time.

In the existing process, as described above, both the predefined waiting time for pending transactions and the waiting time for data synchronization may influence the service outage time. Therefore, both the predefined waiting time for pending transactions, and the waiting time for data synchronization may be considered to be cancelled or to be reduced, in order to improve or reduce the service outage time. A new method for reducing the service outage time for a planned event in a system is described in this disclosure.

Figure 4:
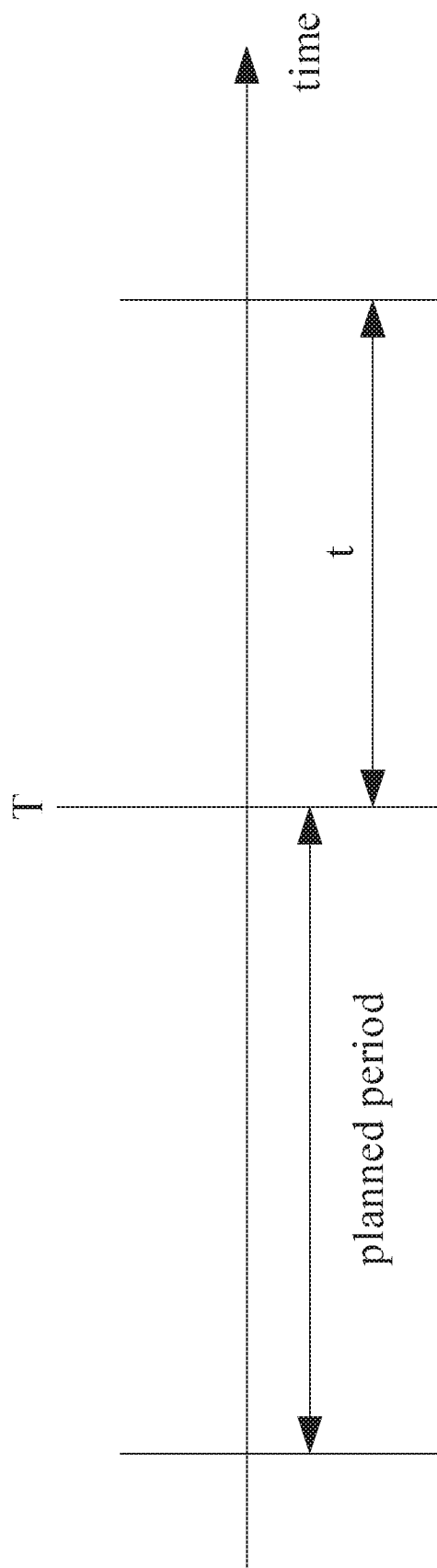
FIG. 4 is a timeline of a planned period in a planned event, in accordance with an embodiment of the present invention.

Referring now to FIG. 4, a timeline of a planned period in a planned event, in accordance with an embodiment of the present invention, is shown. A planned event may occur at a time T, and a planned period may be defined as a time period before time T. In an embodiment, data synchronization may cost a maximum time period t, and a time period between T-t and T may be defined as the planned period during which changed data may be stored in the on-line system 210, as shown in FIG. 2. The time T may be set up by the administrator in advance, and the time period t can be estimated using historical data. The historical data may include, for example, an amount of workload in the on-line system 210 during different times, an average workload, and a maximum workload. An estimation of a length of time to transmit data may be calculated for a maximum workload. An estimation of a length of time to replicate the transmit data between the first database 211 and the second database 221, of FIG. 2, for the maximum workload, may be obtained, resulting in a maximum time period t.

In an embodiment, an average time for data synchronization between the first database 211 and the second database 221, may be used as the time period t. In an alternate embodiment, the planned period may be set as an average time for data synchronization between the first database 211 and the second database 221, plus an additional length of time, resulting in a maximum time period t. Additional changed data may be stored in the on-line system 210 during the maximum time period t, than in the time period t, resulting in a longer service outage time than using the above planned period between T-t and T. However, the service outage time with the longer service outage time, remains shorter than using an existing method, as described above in relation to FIG. 3.

Figure 5:
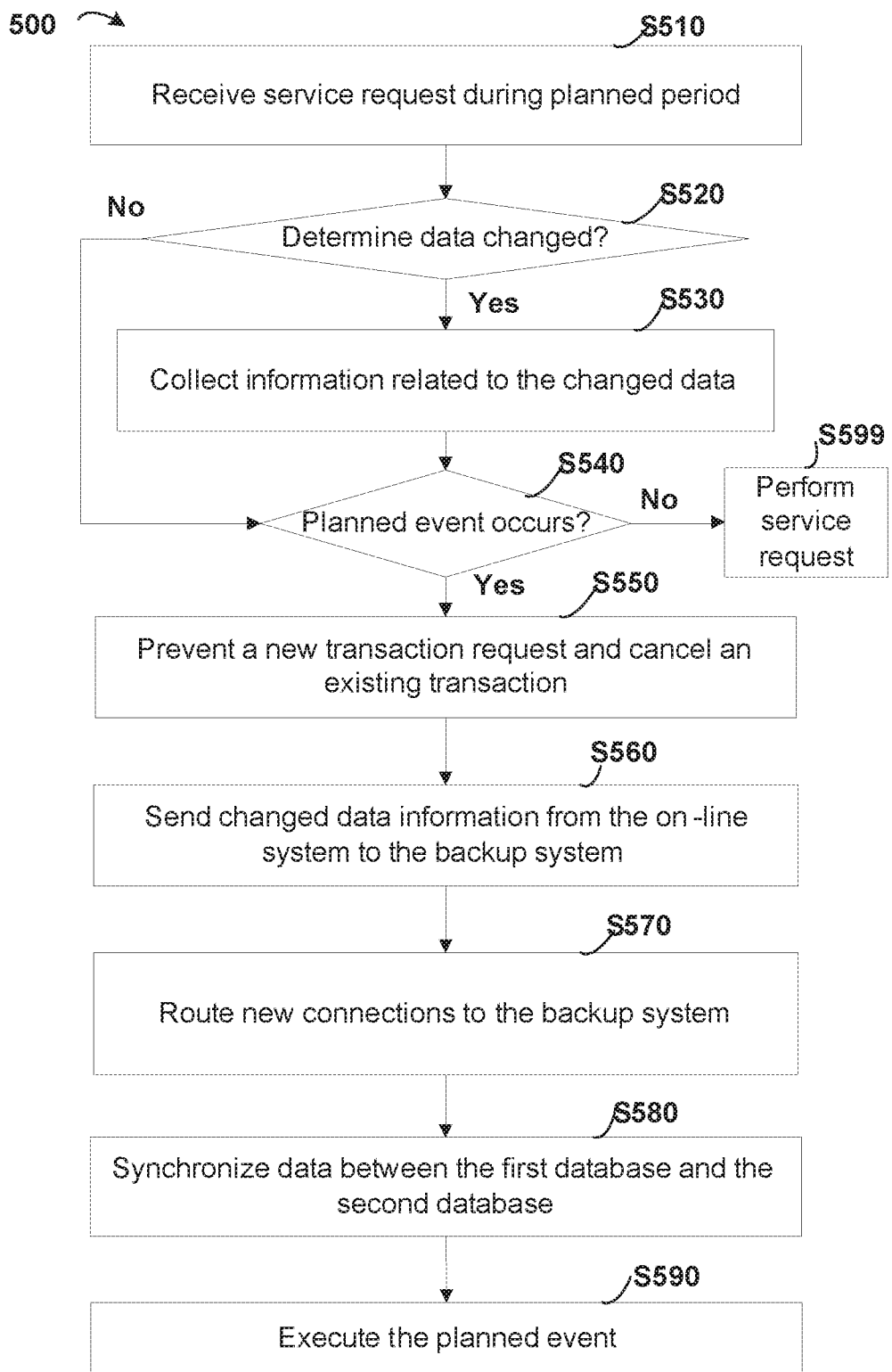
FIG. 5 is a proposed flowchart for the planned event in the on-line system, in accordance with an embodiment of the present invention.

Referring now to FIG. 5, a proposed flowchart 500 for a planned event in an on-line system, in accordance with an embodiment of the present invention, is shown. A time of the planned event occurrence may be controlled, and an administrator can select the time of the planned event occurrence, such as midnight on a Saturday when there may be fewer customer service requests than average. Selecting the time of the planned event occurrence may result in a smaller amount of pending transactions which may fail at an end of the predefined waiting time. The predefined waiting time for pending transactions may be cancelled in order to reduce a service outage time for a planned event in a system. The waiting time for data synchronization is necessary to maintain data integrity between the first database 211 and the second database 221.

The back-up system 220, as shown in FIG. 2, may process a new service request 250 during the time of data synchronization between the first database 211 and the second database 221, with additional process steps.

During the time of data synchronization between the first database 211 and the second database 221, transactions with the second database 221 may be affected by changed data in the first database 211. Addresses of changed data in the first database 211 may be recorded during a planned period, in advance of the planned event time T, as shown in FIG. 4. During the planned period, as described in FIG. 4, the addresses of changed data in the first database 211 may be stored in both the on-line system 210, and the back-up system 220, before the back-up system 220 receives a new service request 250 from a customer.

In an embodiment of the current invention, the back-up system 220 may accept a new service request 250 rather than allowing the back-up system 220 to be inactive for a new service request 250, and may determine whether or not to process the new service request 250. During the data synchronization, the back-up system 220 can determine whether the new service request 250 is related to the changed data. The back-up system 220 can determine whether to process or reject the new service request 250 based on whether the new service request 250 is related to the changed data. In this way, during the synchronization, the back-up system 220 can process a new service request 250, and reduce the service outage time.

Referring to FIG. 5, the proposed process may be executed by the on-line system 210, as shown in FIG. 2, or by one or more processors which are connected to the on-line system 210. The one or more processors connected to the on-line system 210 may be regarded as part of the on-line system 210.

At step S510, the proposed process begins when a service request 250, or a transaction, is received from a customer in an existing connection to the on-line system 210 during a planned period, as described above in relation to FIG. 4.

At step S520, a determination is made whether data in the first database 211, as shown in FIG. 2, may be modified by the transaction. In an embodiment, the step S520 may be implemented by analyzing a structured query language (SQL) query in the transaction. For example, if the SQL query is an "insert" or a "delete" operation to the first database 211, it can be determined that the data in the first database 211 of the on-line system 210 may be changed by the transaction.

At step S530, information related to the changed data may be collected and stored in a data structure at step S530. In an embodiment, possible SQL queries can be classified as a changing data query or as an unchanging data query, which may assist in analyzing the SQL query in the transaction.

In an embodiment, the information related to the changed data may comprise the location or address of the changed data in the first database 211. Data in the first database 211 may be stored in a table, and the information related to the changed data may comprise at least one table name and at least one row number. The information related to the changed data may be sent to the second database 221. When a new transaction with the second database 221 in the back-up system 220 is received, the information related to the changed data may be used to determine if the new transaction may be related to the changed data. In another embodiment, the information related to the changed data may further comprise an ID of the transaction with the first database 211, which can be used to determine if the new transaction may be related to the changed data.

In an embodiment, a data structure of the first database 211 may comprise a table. In an alternate embodiment, the data structure may comprise an XML file or other data file. The data structure may be synchronized between the first database 211 and the second database 221 during the data replication operation.

At step S540, a determination whether a planned event occurs is made. In the planned event, the back-up system 220 may be switched on to set up a new connection and accept a new transaction or service request 250 using the second database 221. The step S540 may be implemented by receiving a command by the on-line system 210, from the administrator, or from another system, and that the back-up system 220 may be put on line. In an alternate embodiment, the on-line system 210 may determine an occurrence of the planned event by checking any predefined condition, such as predefined time to start the planed event, or other predefined parameters, etc. If the planned event does not occur, an existing service request 250 may be executed by the on-line system 210 using the first database 211, and results for the service request 250 may be stored in the first database 211, at step S599. The on-line system 210 may continue to receive an additional service request 250 from customers through the router 230, as shown in FIG. 2.

In an embodiment, the two steps S520 and S599 may be implemented simultaneously using a two phase commit in the database. In a first phase of the two phase commit, a record or information regarding the changed data in the first database 211 may be obtained, e.g. at least one table name and at least one row number, at step S520. In a second phase of the two phase commit, the on-line system 210 may execute a service request 250, at step S599.

Continuing to refer to FIG. 5, if the planned event occurs, as determined at step S540, the process may continue to step S550. Step S550 comprises both preventing a new connection or a new service request 250 to the on-line system 210, and cancelling an existing transaction or service request 250 with the first database 211. In an embodiment, the step S550 may be implemented by sending a "Quiesce" command or an "inactive" command to the on-line system 210. The on-line system 210 may be designed such that if either the "Quiesce" command or the "inactive" command is received, the on-line system 210 cannot accept a new connection request and also may reset an existing connection. The router 230, as shown in FIG. 2, may continue to route a new connection request to the on-line system 210, but the on-line system 210 cannot provide service to the customers, e.g. the service is experiencing an outage.

Next, at step S560, stored information related to the changed data is sent from the on-line system 210 to the back-up system 220, through the private network 260, as shown in FIG. 2, for data replication, or synchronization.

At step S570, a new service request 250 may be routed by the router 230 to the back-up system 220, for example to set up a new connection and to conduct a new transaction, using the the second database 221. The step S570 can be implemented by sending new route information to the router 230 such that the new request can be routed to the back-up system 220 and the back-up system 220 may set up a new connection with a customer. At a conclusion of the service outage, when service is recovered, the back-up system 220 can provide service to the customers.

At step S580, after transmission of the stored information related to the changed data, data between the on-line system 210 and the back-up system 220 can be synchronized through the private network 260, as shown in FIG. 2, for data replication. The step S570 and the step S580 can be executed at the same time, and an execution time of the step S570 can be ignored because a command execution time, such as this, may be less than millisecond. The execution time of step S580 for data synchronization between the first database 211 and the second database 221 is much longer than a command execution time, and may be several minutes if there is medium work load in the on-line system 210. The step S570 and the step S580 can be executed concurrently, or alternatively, the step S580 can be executed a little earlier than the step S570. Therefore, the time of data synchronization at the step S580 may not be the main part of the service outage time in the proposed process.

In the proposed method, during the transmission time for the stored information related to the changed data from the on-line system 210 to the back-up system 220, neither system can support a new request from a customer, which is the service outage in the first method described. However, in the current method, during the time of data synchronization at the step S580, the back-up system 220 can receive the new request and set up connection, in other words, the time of data synchronization is not service outage time. And since the data size of the stored information related to the changed data is far less than the data size of each data synchronization between the first database 211 and the second database 221, it may take less time for the on-line system 210 to transmit the stored information related to the changed data from the on-line system 210 to the back-up system 220, considering a high transmission speed of the private network 260. In other words, the service outage time in the processed process is far less than the service outage time in the existing solution.

At step S590, execution of the planned event occurs.

Figure 6:
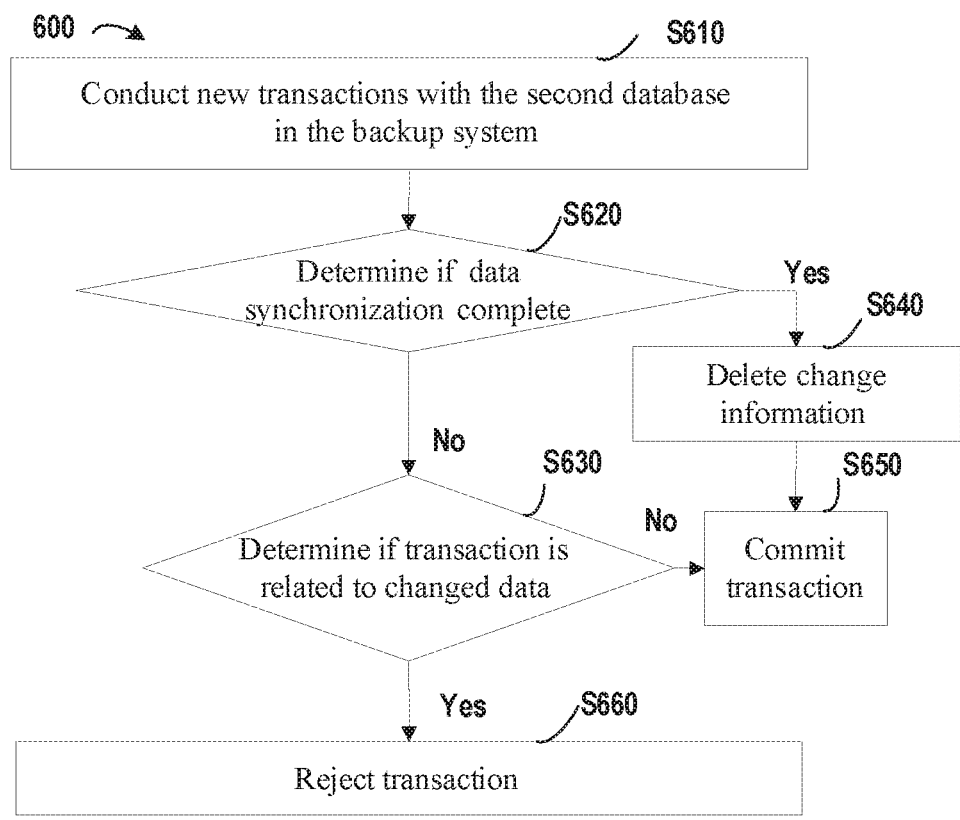
FIG. 6 is a proposed flowchart for the planned event in the back-up system, in accordance with an embodiment of the present invention.

Referring now to FIG. 6, a proposed flowchart 600 for a planned event in a back-up system, in accordance with an embodiment of the present invention, is shown. The proposed process can be executed by the back-up system 220, or by one or more processors which are connected to the back-up system 220. Here the one or more processors can be regarded as part of the back-up system 220. The other steps that the on-line system 210 initiates and the back-up system 220 is the receiver has not included in the process of FIG. 6.

At step S610, the proposed process begins when a new connection may have been set up in the back-up system 220 and a new transaction with the second database 221 are conducted.

At step S620, in an embodiment, the back-up system can determine whether the data synchronization is complete at step S620. If the data synchronization completion is known by the back-up system for a first time, the back-up system can delete the received information related to the changed data at step S640 to save the storage in the back-up system. Once the received information related to the changed data is detected, it is determined that the data synchronization is complete, the proposed process can go to step S650 directly to commit a transaction, or service request 250. In an embodiment, the step S640 is an optional step, because the data size of the received information related to the changed data is not big, it may not occupy much storage space in the back-up system. In an embodiment, an identification that the data synchronization is complete for the first time can be determined using a flag parameter, for example, the flag parameter can be set as one value, such as "0" before the data synchronization, once the data synchronization is complete, the flag parameter can be set as another value, such as "1", then whether the data synchronization is complete for the first time can be determined by checking the flag parameter's value. In another embodiment, if the data synchronization is determined to be complete at step S620, the transactions can be committed to the second database directly at step S650 so as to get the results to the customers without step S640.

In a situation where the step S620 determines the data synchronization is not complete, the process may continue to step S630. The back-up system 220 can further determine whether the transaction is related to the changed data based on the received information related to the changed data. If the transaction is not related to the changed data, then the transaction can be committed to the second database 221 at step S650. If the transaction is related to the changed data, the back-up system 220 can reject the transaction at step S660, and the transaction is failed. Because the data synchronization is not complete, the changed data in the second database 221 may not be consistent with the data in the first database 211. To reject the transactions can make sure not to get the wrong results from the second database.

In an embodiment, the steps S630 and S650 can be implemented by a two phase commit in the database. In the first commit, the records of changed data in the second database 221 can be returned, e.g. at least one table name and at least one row number that the changed data locate in the second database can be obtained from the records and can be compared with the information related to the changed data in the data structure at step S630, if the at least one table name and the at least one row number that the changed data locate in the second database are not within the data structure. In the second commit, the on-line system 210 can commit the transaction at step S650.

Figure 7:
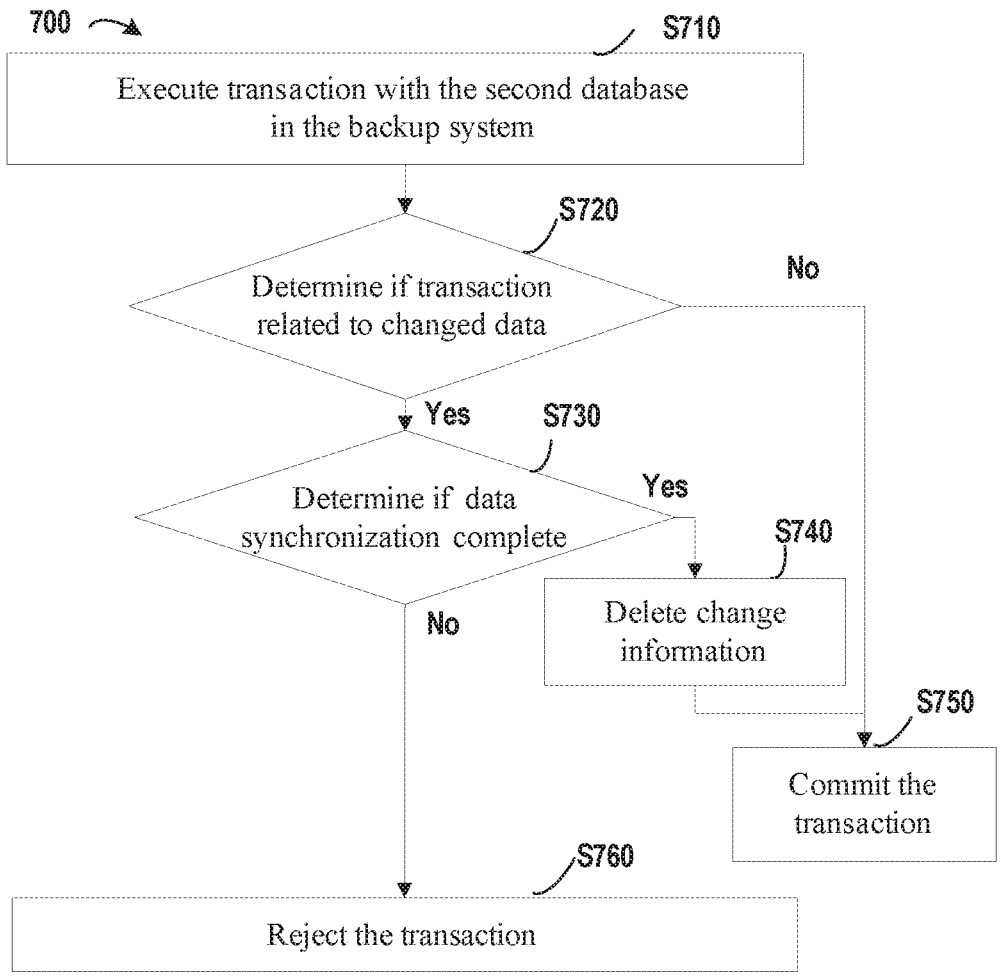
FIG. 7 is a proposed flowchart for the planned event in the back-up system, in accordance with an embodiment of the present invention.

In an embodiment, the steps S620 and Step S630 can be exchanged in the FIG. 6, e.g. the back-up system 220 can execute step S620 to determine whether the data synchronization is complete first, then execute step S630 to determine whether the transactions are related to the changed data, the back-up system 220 can also execute step S630 to determine whether the transactions are related to the changed data first then execute step S620 to determine whether the data synchronization is complete, as shown below in regards to FIG. 7.

Referring now to FIG. 7, a proposed flowchart 700 for a planned event in a back-up system, in accordance with an embodiment of the present invention, is shown. The proposed process can be executed by the back-up system 220, or by one or more processors which are connected to the back-up system 220. The one or more processors can be regarded as part of the back-up system 220.

At step S710, the proposed process begins when a new connection may have been set up to the back-up system 220 and a new transaction with the second database 221 is conducted or executed.

At step S720, a determination whether data in the transaction is related to the changed data is based on whether the received information is related to the changed data. If the transaction is not related to the changed data, then the transaction can be committed to the second database 221 at step S750. If the transaction is related to the changed data, the back-up system can determine whether the data synchronization is complete at step S730. If the data synchronization is complete for the first time, the back-up system can delete the received information related to the changed data at step S740 to save the storage in the back-up system 220. The step S740 is an optional step, because the data size of the received information related to the changed data is not big, and it may not occupy much storage space in the back-up system 220. In another embodiment, if the data synchronization is determined to be complete at step S730, the transaction can be committed to the second database 221 directly at step S750 so as to get the results to the customer. And if the data synchronization is not complete, as determined at step S730, the back-up system 220 can reject the transaction at step S760 to make sure not to get the wrong results from the second database 221.

In an embodiment, the steps S720 and S750 can be implemented by two phase commits in the database. In the first commit, the records of changed data in the second database 221 can be returned, e.g. at least one table name and at least one row number that the changed data locate in the second database can be obtained from the records and can be compared with the information related to the changed data in the data structure at step S720, and if the at least one table name and the at least one row number that the changed data locate in the second database are not within the data structure, the in the second commit, the on-line system 210 can commit the transactions at step S750.

In another embodiment, the proposed process for the back-up system 220 can determine whether the data synchronization is not complete and whether the transactions are related to the changed data, and then the back-up system can reject the transaction in response to the data synchronization being not complete and the transactions being related to the changed data. Otherwise, the back-up system 220 can commit the transaction.

In an embodiment, if the data synchronization may be complete soon, the new transaction may not be rejected. The same new transaction may be initiated again soon by the customer, if the customers' previous request was rejected. Step S660 or step S760 can be replaced by another embodiments shown in FIG. 8.

Figure 8:
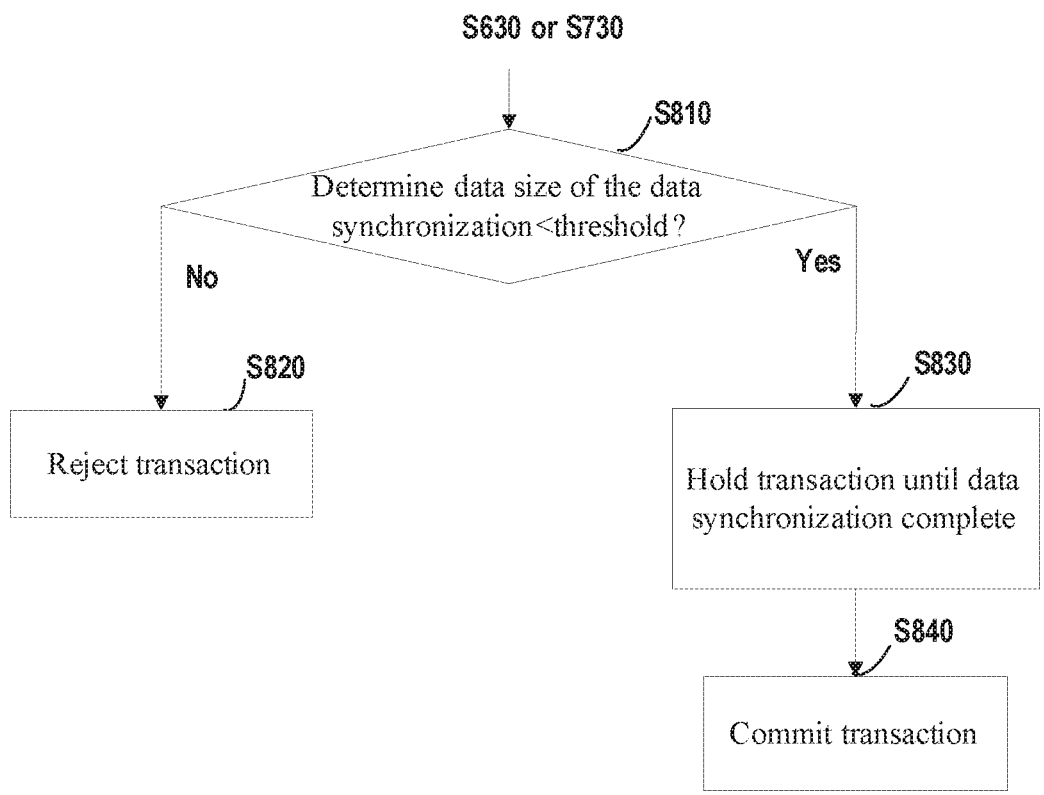
FIG. 8 is an embodiment of an implemented flowchart for the step S660 in FIG. 6 or S760 in FIG. 7, in accordance with an embodiment of the present invention.

Referring now to FIG. 8, a proposed flowchart 800 for the step S660 in FIG. 6 or S760 in FIG. 7, in accordance with an embodiment of the present invention, is shown.

At step 810, a determination is made whether the data size of data synchronization between the first database 211 and the second database 221 is above a predefined data threshold, in response to the data synchronization being not complete and the transactions being related to the changed data. And if the data size of the data synchronization between the first database 211 and the second database 221 is below the predefined data threshold, it means that the data synchronization may be complete soon, then the back-up system 220 can hold the transactions with the second database 221 until data synchronization between the first database 211 and the second database 221 is complete at step S830, then the back-up system 220 can commit or execute the transaction and return the transaction result to the customer at step S840. And if the data size of the data synchronization between the first database and the second database is greater than the predefined data threshold, it means that the data synchronization may not be complete soon, if the back-up system 220 makes the transaction held, the customer may not get a transaction result soon, and then the customer may think the service is in an outage state. Thus the back-up system 220 can reject the transaction at step S820, and may provide a comments such as "The system is busy, please send your request later" to the customer. In another embodiment, the back-up system 220 can provide the customer a choice whether she would like to hold the transaction at step S820.

In an alternative embodiment, the customer may hope to conduct the transaction and get the transaction results in any case, if the back-up system 220 finds that the data synchronization is not complete, the back-up system 220 can provide selection for the customer whether she would like to wait for the conclusion of the transaction, if the customer would like to wait for the conduction of the transaction, the back-up system 220 can make the transactions held until the data synchronization is complete, then the back-up system 220 can commit the transaction and return the transaction result to the customer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
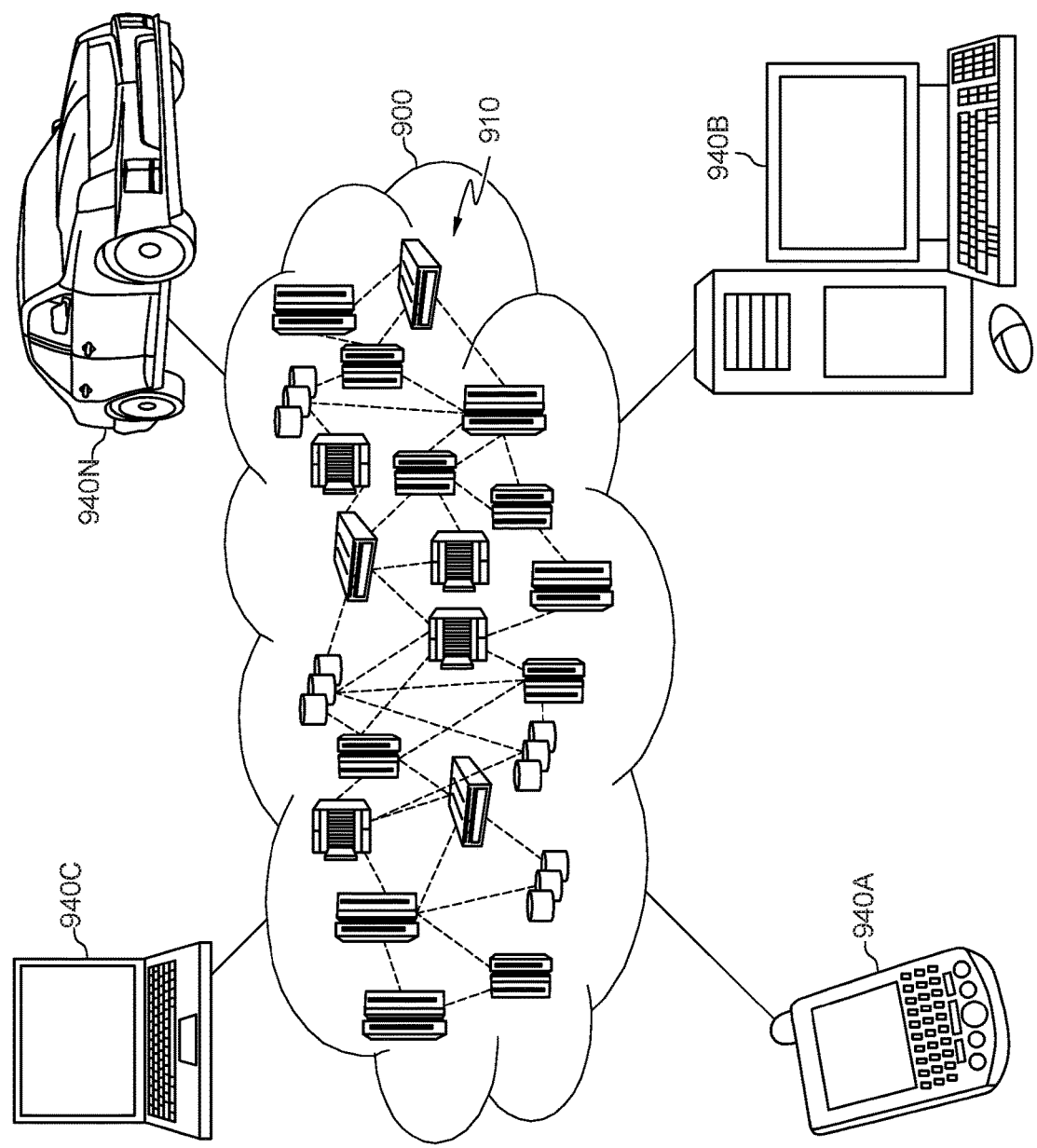
FIG. 9 is a block diagram of functional layers of an illustrative cloud computing environment, including the distributed data processing environment depicted in FIG. 1, in accordance with an embodiment of the present disclosure.

Referring now to FIG. 9, illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 940A, desktop computer 940B, laptop computer 940C, and/or automobile computer system 940N may communicate. Cloud computing nodes 910 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 940A-N shown in FIG. 9 are intended to be illustrative only and that cloud computing nodes 910 and cloud computing environment 900 can communicate with any type of computerized device over any type of network and/or network addressable connection (e.g., using a web browser).

Figure 10:
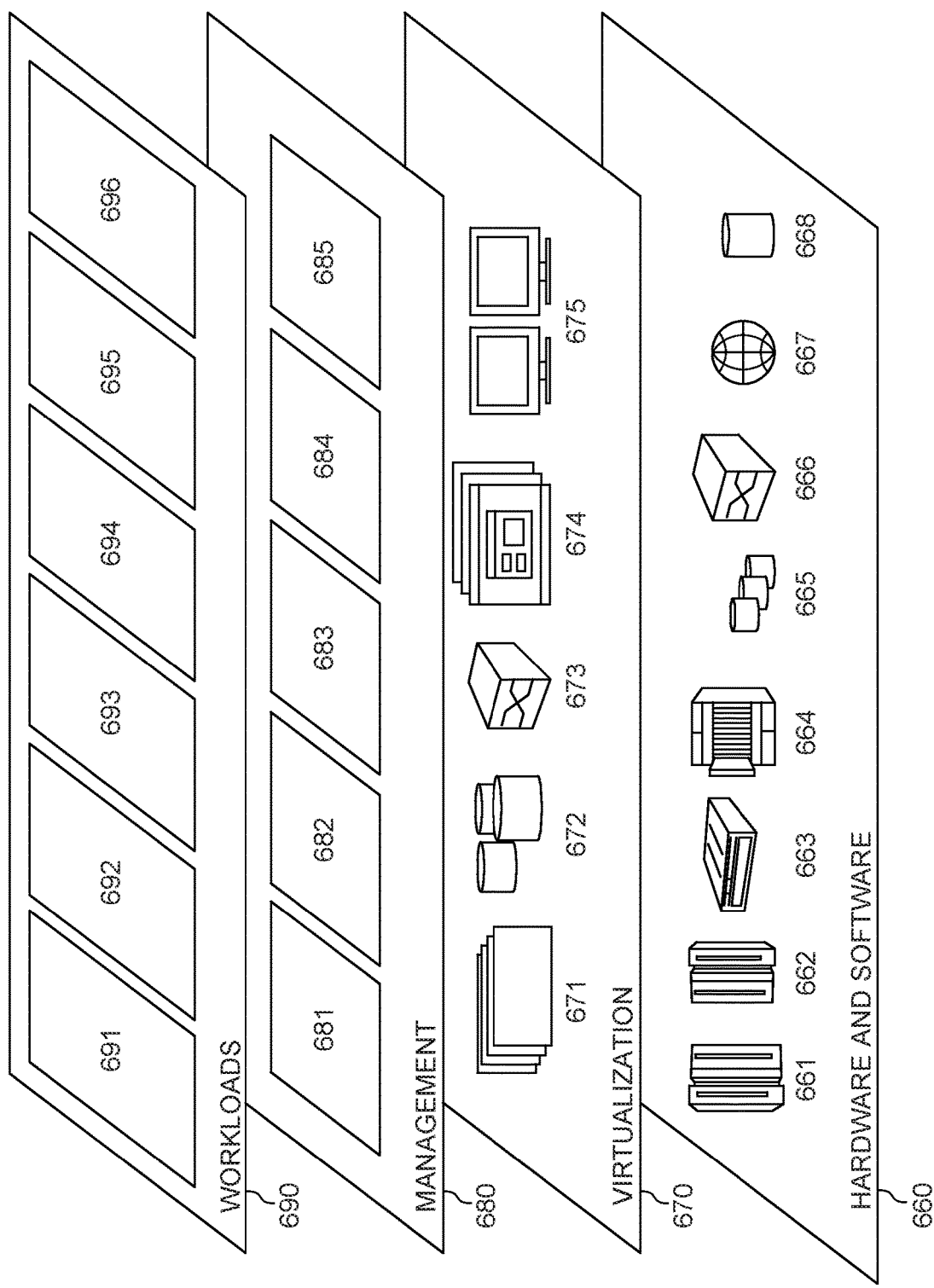
FIG. 10 is a functional block diagram of functional layers of the illustrative cloud computing environment of FIG. 9, in accordance with an embodiment of the present invention.

Referring now to FIG. 10, a set of functional abstraction layers provided by cloud computing environment 900 (as shown in FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 114 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and service outage time reduction for a planned event in a system 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
storing, by an on-line system, information related to changed data in response to an existing transaction with a first database of the on-line system being conducted during a planned period, and data in the first database being changed by the transaction, wherein information related to the changed data comprises an identification code of the transaction with the first database, wherein the planned period is a time period before a planned event, wherein the time period comprises an average time for data synchronization between the first database and a second database of a back-up system plus an additional length of time;
in response to the planned event occurring in which the back-up system with the second database is switched on to set up a new connection and a new transaction with the second database is conducted, wherein the second database is a backup of the first database,
preventing, by the on-line system, a new connection to the on-line system and cancelling an existing transaction with the first database during the planned period, and
sending, by the on-line system, the information related to the changed data to the back-up system;
committing, by the back-up system, the new transaction with the second database in the back-up system, in response to the new transaction being not related to addresses of the changed data according to the information related to the changed data;
routing to the back-up system a new connection and a new transaction with the second database; and
synchronizing, by the on-line system, data between the first database and the second database.

2. The method according to claim 1, wherein the planned event occurs at time T, and data synchronization between the first database and the second database costs maximum time period t, the planned period is time period between time T-t and time T.

3. The method according to claim 1, further comprising:
rejecting, by the back-up system, the new transaction with the second database in the back-up system, in response to the new transaction being related to the changed data according to the information related to the changed data and the data synchronization between the first database and the second database not being complete.

4. The method according to claim 1, further comprising:
holding, by the back-up system, the new transaction with the second database until the data synchronization between the first database and the second database is completed, in response to the new transaction being related to the changed data according to the information related to the changed data and data size of the data synchronization between the first database and the second database being below a threshold; and
rejecting, by the back-up system, the new transaction with the second database, in response to the new transaction being related to the changed data according to the information related to the changed data and the data size of the data synchronization between the first database and the second database being greater than the threshold.

5. The method according to claim 1, further comprising:
committing, by the back-up system, the new transaction with the second database in the back-up system in response to the data synchronization between the first database and the second database being complete.

6. The method according to claim 1, wherein the information related to the changed data comprises at least one table name and at least one row number of the changed data location in the first database.

* * * * *